United States Patent [19]

Arimura et al.

[11] 3,749,835

[45] July 31, 1973

[54] CONTINUOUS SIGNAL PRODUCING SYSTEM

[75] Inventors: Ichiro Arimura, Kyoto; Hiroshi Taniguchi, Hirakata; Hiromichi Tanaka, Kadoma, all of Japan

[73] Assignee: Matsushita Electric Industrial Co. Ltd., Osaka, Japan

[22] Filed: May 11, 1971

[21] Appl. No.: 142,328

[30] Foreign Application Priority Data

May 13, 1970 Japan .............................. 45/41240

[52] U.S. Cl. 178/69.5 CB, 178/5.4 CD, 178/5.4 SY

[51] Int. Cl. ............................................ H04n 9/46

[58] Field of Search .................. 178/69.5 CB, 5.4 R, 178/5.4 SY, 5.4 CD

[56] References Cited

UNITED STATES PATENTS

| | | | |
|---|---|---|---|
| 3,609,223 | 9/1971 | Tajiri | 178/5.4 CD |
| 3,614,305 | 10/1971 | Hidaka | 178/5.4 CD |

*Primary Examiner*—Richard Murray
*Attorney*—Stevens, Davis, Miller & Mosher

[57] ABSTRACT

A continuous signal producing system for producing a continuous signal locked to an intermittent burst signal. The burst signal is changed to a higher frequency signal in the presence of a stable local oscillator, and the higher frequency signal thus obtained is used to drive an APC to thereby produce a continuous signal phase locked to the higher frequency intermittent burst signal.

6 Claims, 12 Drawing Figures

PRIOR ART APC

In this method, the modulated chrominance signal is recorded without frequency modulation, but the FM carrier of the luminance signal modulation provides an AC bias effect so that it is possible to achieve recording and reproduction with high efficiency and very little distortion. Also, the modulated chrominance signal at the time of recording has wavelengths 5 to 7 times that of the FM carrier, so that the signal-to-noise ratio of the reproduction of the modulated chrominance signal is quite good and the reproduced signal level is so stable that no problems arise in the reproduced picture. Further, since the modulated chrominance signal is recorded without frequency modulation, essentially no moire effect results. Furthermore, since the luminance signal can be handled just as the monochrome signal, it is possible to improve the signal-to-noise ratio in the reproduced picture by increasing the preemphasis. This also improves the differential gain and differential phase in the reproduced picture.

Moreover, it is by far the most important advantage of the method of recording and reproducing the signal shown in FIG. 1*c* over the method of recording the direct frequency modulation of the NTSC signal of FIG. 1a that the phase error or timing irregularities introduced by the recorder are greatly reduced.

To describe this aspect in more detail, in case of recording and reproducing the direct frequency modulation of the NTSC signal of FIG. 1*a*, the modulated chrominance signal of the 3.58 MHz color subcarrier undergoes timing variation $\Delta f$. In other words, the reproduced modulated chrominance signal can be represented as $$3.58 \text{ MHz} + \Delta f \ldots \quad (1)$$

On the other hand, when the color subcarrier frequency is shifted to $3.58/n$ MHz as a result of the low frequency conversion of the modulated chrominance signal, the recording and reproduction of this signal with the same recording and reproducing apparatus introduces only a timing change of $\Delta f/n$. In this case, the reproduced modulated chrominance signal is given as $$1/n(3.58 \text{ MHz} + \Delta f) \ldots \quad (2)$$

Changing the frequency of this reproduced signal in the presence of a stable local oscillator oscillating at a frequency of $n - 1/n \times 3.58$ MHz yields the resultant modulated chrominance signal product given as $$3.58 \text{ MHz} + \Delta f/n \ldots \quad (3)$$

As is apparent, the timing error component in the signal of formula (3) is only $1/n$ of that in the signal of formula (1). Thus it becomes extremely easy to eliminate timing error component.

In the NTSC or PAL system, the so-called quardrature two-phase modulation is adopted to produce the modulated chrominance signal, which is multiplexed with the luminance signal to produce the composite color television signal. The composite color television signal includes a color synchronizing signal in the form of a burst of several cycles of the color subcarrier intermittently inserted on each horizontal blanking pulse back porch adajcent the horizontal sync pulse, as shown in FIG. 2. This color burst serves as a reference signal for demodulating the modulated chrominance subcarrier signal. In the color television receiver, a continuous signal locked in phase and frequency to the color burst is produced for demodulation of the modulated chrominance signal to obtain two color video signals.

Generally, when a signal is recorded and reproduced, timing error information is introduced in the reproduced signal. Usually, the color television receiver can respond to only extremely slight timing errors of extremely low frequencies. However, the timing variations resulting from the recording and reproduction of signals with simplified type video tape recorders usually far surpass the response range of the color television receiver. Therefore, it is necessary to reduce or eliminate timing variation components in the color signal in the reproduced signal on the side of the video tape recorder.

FIG. 3 shows an example of the conventional method of cancelling the timing error component in the modulated chrominance signal in the recovered NTSC signal. In this method, a continuous signal locked in phase and frequency to the separated color burst is combined with the output of a stable local oscillator to produce a sum frequency signal, which is combined with the aforesaid modulated chrominance signal to produce a difference frequency signal to thereby cancel the timing error component. Referring now to FIG. 3, the reproduced NTSC signal appears at an input terminal 1. A low-pass filter 2 separates the luminance signal from the input signal. A band-pass filter 3 separates the modulated chrominance siganl 3.58 MTTz±500KHz from the input signal. A burst gate 4 extracts the color burst. Numeral 5 designates an APC having a construction as shown in detail in FIG. 6. Its oscillation is locked in phase and frequency to the extracted color burst. Numeral 6 designates a crystal oscillator oscillating at a frequency $f_1$ coupled to a balanced modulator 7 for the balanced modulation with the APC output. A band-pass filter 8 passes the sum frequency signal output ($3.58 \text{ MHz} + f_1$) of the balanced modulator 7. Numeral 9 designates a crystal oscillator oscillating at a frequency of $3.58 \text{ MHz} + f_1$, which is coupled to a balanced modulator 10 for the balanced modulation with the output of the band-pass filter 3. A band-pass filter 11 passes the sum frequency signal ($7.16 \text{ MHz} + f_1$) of the outputs of the band-pass filter 3 and crystal oscillator 9. A balanced modulator 12 combines the outputs of the band-pass filters 8 and 11. A band-pass filter 13 passes the difference frequency signal of the difference frequency 3.58 MHz between the frequencies of the outputs of the band-pass filters 8 and 11. A mixer 14 combines the luminance signal output of the low-pass filter 2 and the chrominance signal output of the band-pass filter 13 to produce an NTSC signal including chrominance signal free from timing error information appearing at an output terminal 15.

The reason why the timing error component in the modulated chrominance signal is cancelled will now be breifly discussed. Denoting the timing change in the 3.58 MHz modulated chrominance signal in the recovered NTSC signal appearing at the input terminal 1 by $\Delta f$, the output of the band-pass filter 3 is 3.58 MHz + $\Delta f$, the bracketed notation indicating that this signal contains only the information concerning the modu-

CONTINUOUS SIGNAL PRODUCING SYSTEM

The present invention relates to the production of a continuous signal locked in phase and frequency to an intermittent signal such as the color burst in the composite color television signal.

It is well known in the art that the APC employed in the color television receiver is capable of producing a continuous signal locked in phase and frequency to the intermittently transmitted color burst. In the NTSC composite color television signal, the color burst frequency is 3.58 MHz. If the color burst frequency is reduced, the number of burst cycles in the burts insertion interval is reduced since the burst insertion interval is constant. If the mumber of burst cycles is reduced too much, the usual APC construction employed in the color television receiving set becomes useless.

The methods of recording and reproducing composite color television signal with simplified video tape recorders include one of the known type in which the modulated chrominance signal is changed to a lower frequency band. In this type of the recording and reproducing method, the modulated chrominance signal in the composite color television signal is frequency shifted to a lower band while frequency modulating the luminance signal so as to space the frequency shifted modulated chrominance signal outside the lower sideband of the frequency modulation of the luminance signal for recording and reproduction.

In the recording and reproduction of the composite color television signal, it is necessary to provide a continuous signal locked in phase and frequency to the color burst in order to remove timing variations or jitter components introduced into the recovered chrominance signal. In the chrominance signal lower band conversion type recording and reproduction, the chrominance subcarrier frequency is lowered to reduce the color burst frequency, it is then extremely difficult to produce a continuous signal locked in phase and frequency to the color burst of the reduced frequency with the usual APC as mentioned eariler.

The principal object of this invention is to provide a system for stably producing from an intermittent signal, such as the color burst in the composite color television signal, particularly from a burst input having a reduced number of cycles, a continuous signal locked in phase and frequency to the burst.

Another object of the invention is to provide a continuous signal producing system for producing a continuous signal synchronized to the color burst, which may be employed for removing the chrominance signal jitter component introduced into the reproduced color television signal when the color television signal is recorded and reproduced by a simplified color video tape recorder.

These and other objects, features and advantages of the present invention will best be understood from the following description, when read in connection with the accompanying drawings, in which:

FIGS. 1*a* to 1*c* show bandwidth charts to illustrate the frequency shifting of the modulated chrominance signal to a lower band while frequency modulating the luminance signal for recording;

Figure 5A:
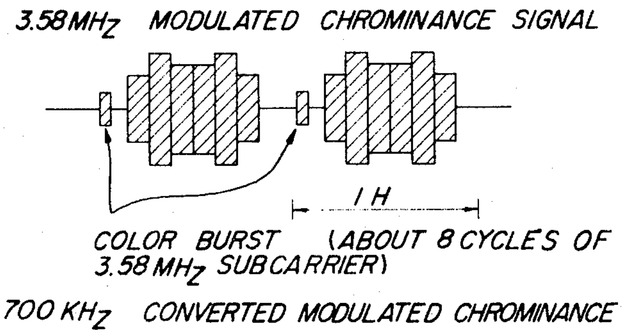
Figure 5B:
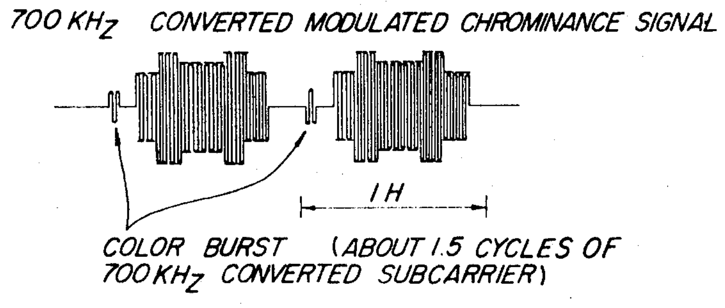
Figure 6:
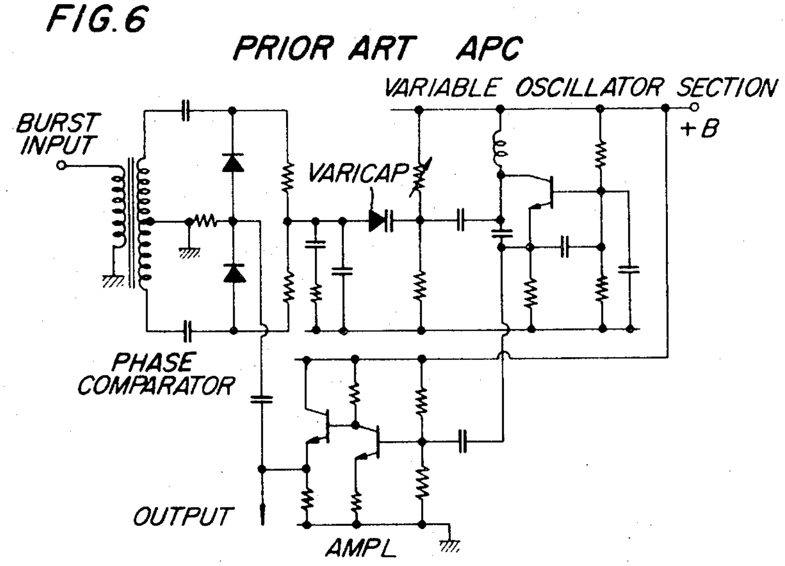
Figure 7:
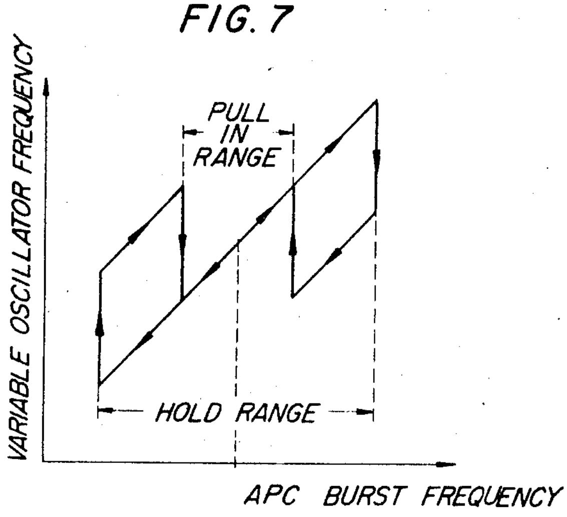
Figure 8:
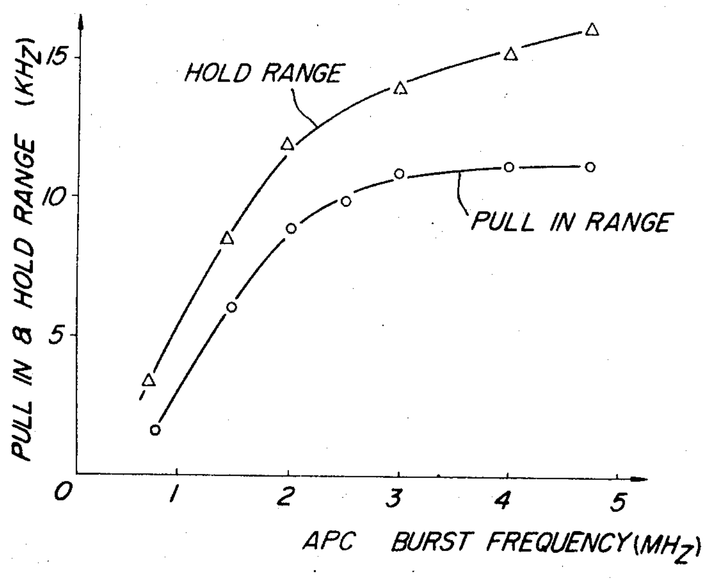
Figure 9:
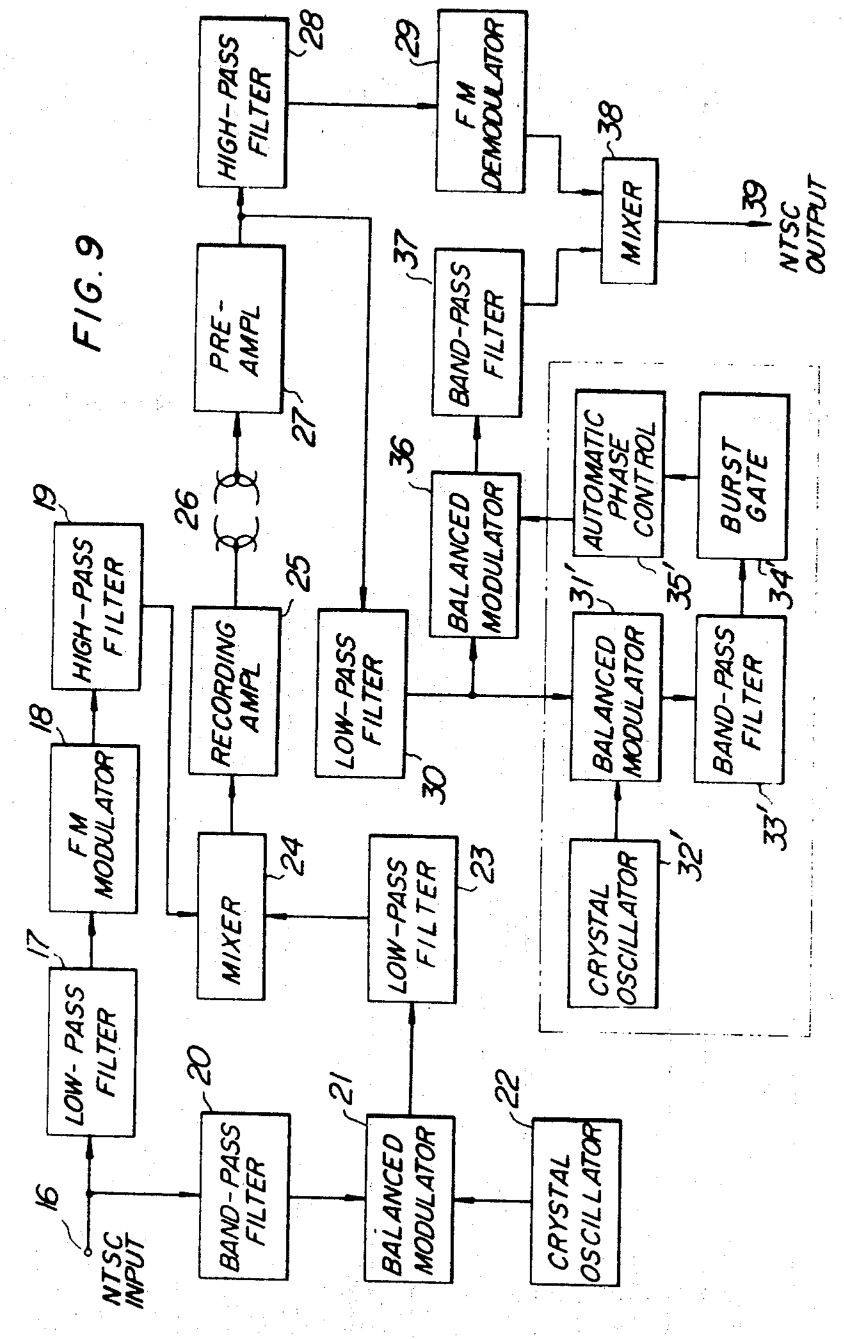

FIGS. 5*a* and 5*b* show the modulated chrominance signal and a lower band conversion of the modulated chrominance signal;

FIG. 6 is a circuit diagram showing an example of the APC employed in color video tape recorders;

FIG. 7 shows the usual APC synchronizing characteristic;

FIG. 8 shows experimental data concerning the APC pull-in range and hold range against the APC burst frequency; and FIG. 9 is a block diagram showing an example of the continuous signal producing system according to the invention for removing the modulated chrominance signal jitter introduced in recording and reproducing the converted low frequency modulated chrominance signal.

The facilitate the understanding of the invention, description will first be made of the recording and reproduction of the NTSC color television signal with a simplified color video tape recorder by the lower band conversion of the modulated chrominance signal while frequency modulating the luminance signal.

Figures 1A, 1B, 1C:
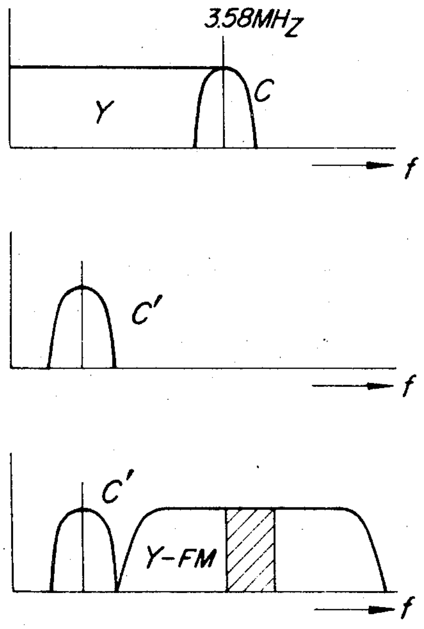
Figure 2:
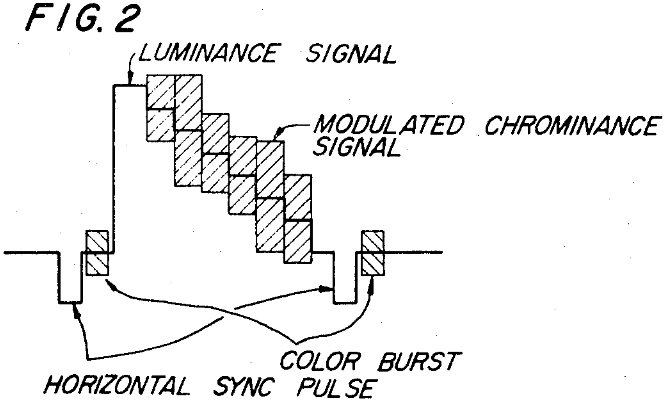
FIG. 2 shows the colorplexed television signal including the luminance signal, modulated chrominance signal, with horizontal sync pulse and color sync burst.
Figure 3:
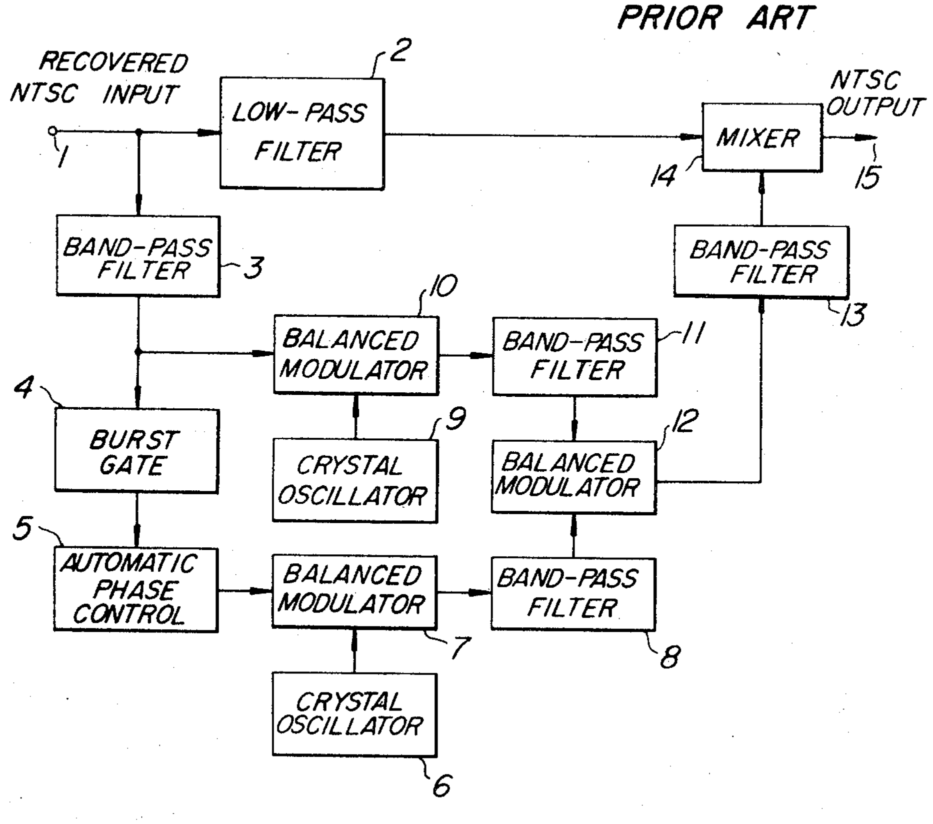
FIG. 3 PRIOR ART
FIG. 3 is a block diagram showing an example of the conventional system for cancelling the timing error or jitter component introduced into the modulated chrominance signal when the composite color television signal is recorded and reproduced by a video tape recorder.

FIG. 1*a* shows the NTSC colorplexed total video signal including the luminance signal (0~4 MHz) indicated at Y and the two-phase modulated chrominance signal (3.58 MHz ± 500 kHz) indicated at C combining two color video signals in quadrature.

In the recording and reproduction of this NTSC signal with a simplified video tape recorder accommodating a narrow frequency band, direct frequency modulation of the video signal for recording is liable to result in undesired components being introduced in the modulated signal (known as moire effect). This is because the energy of the modulated chrominance signal is dominant in high frequency near the FM carrier. Besides this, the FM carrier frequency should be set above 4 MHz. Thus, with a simplified type video tape recorder, almost an upper portion of the available frequency band is used for recording, so that it is extremely difficult to obtain picture reproduction having a sufficient signal-to-noise ratio.

As a method of recording and reproduction avoiding the generation of the afore-mentioned undesired components while effectively utilizing the available frequency band to improve the signal-to-noise ratio of the reproduced signal, it has been proposed to change the modulated chrominance signal in the NTSC signal of FIG. 1*a* into low frequencies while frequency modulating part of the luminance signal Y converting a suitably limited frequency band as shown in FIG. 1*b* so as to space the lower band converted modulated chrominance signal outside the lower frequency portion of the frequency modulated luminance signal as shown in FIG. 1*c* in recording these signals on a magnetic recording medium.

lated chrominance signal. Thus, the APC 5 produces output signal of the frequency 3.58 MHz + $\Delta f$ and the band-pass filter 8 produces an output signal of the frequency 3.58 MHz + $f_1$ + $\Delta f$. The band-pass filter 11 on the other hand produces output signal of the frequency 7.16 MHz + $f_1$ $\Delta f$. Since the balanced modulator 12 subtractively combines the outputs of the band-pass filters 8 and 11, the band-pass filter 13 produces the 3.58 MHz modulated chrominance signal output free from timing error information.

Figure 4:
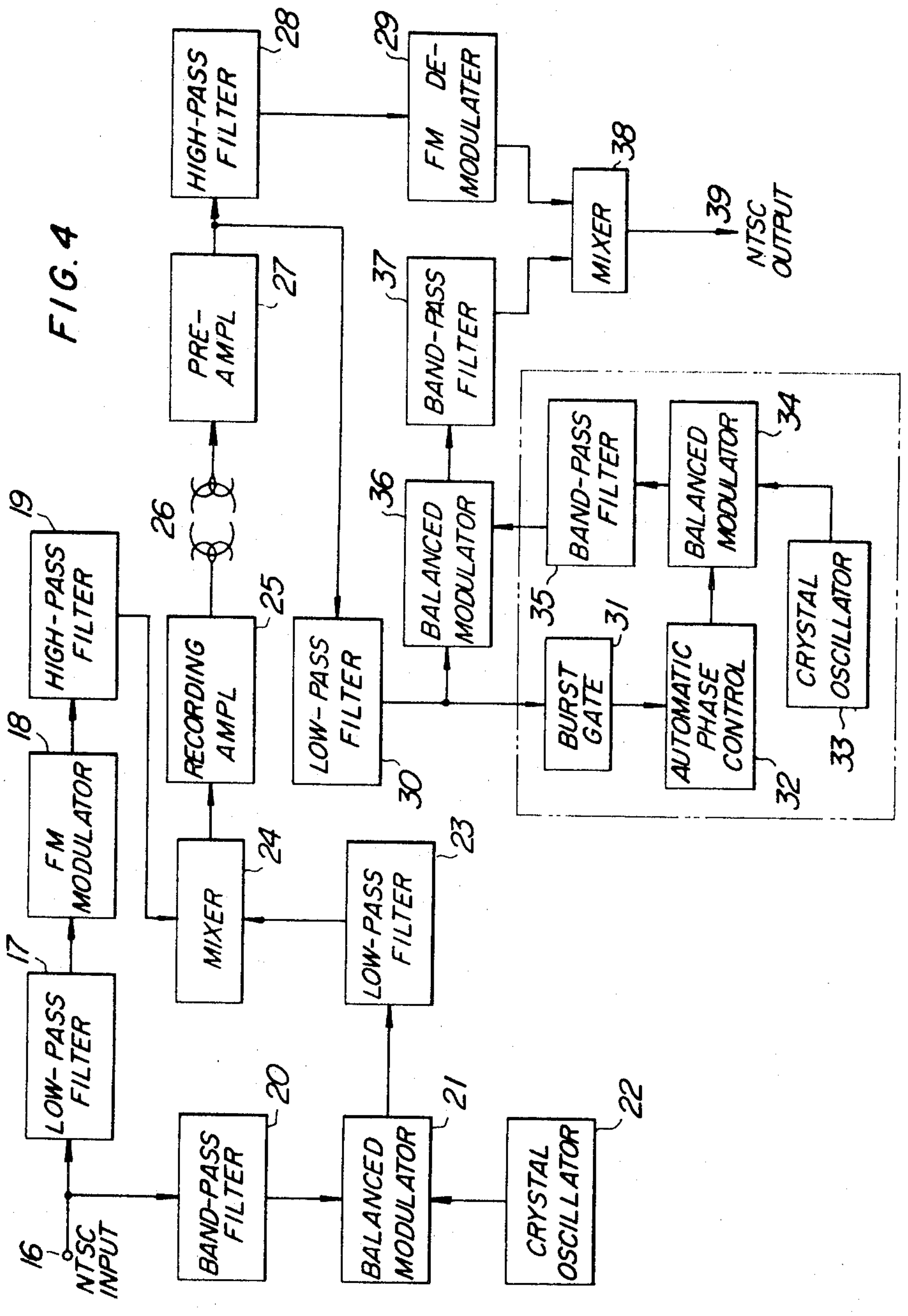
FIG. 4 is a block diagram showing an example of the system for removing the modulated chrominance signal timing error component applied to the conventional recording and reproducing method by changing the modulated chrominance signal to a lower hand.

FIG. 4 shows an example of the modulated chrominance signal timing error component removing system, in which the previous conventional method is applied when changing the modulated chrominance signal to a lower band. Referring to the Figure, from the NTSC signal appearing at an input terminal 16 the luminance signal is separated by a low-pass filter 17. Numeral 18 designates a frequency modulator. Numeral 19 designates a high-pass filter rejecting part of the lower sideband of the frequency modulation of the luminance signal. A band-pass filter 20 separates the modulated chrominance signal of the 3.58 MHz color subcarrier. A balanced modulator 21 modulates the output of the band-pass filter 20 in the presence of a crystal oscillator 22 oscillating at a frequency $f_2$. A low-pass filter 23 separates the difference frequency signal ($f_2$ − 3.58 MHz) from the output of th balanced modulator 21. A mixer 24 combines the FM output of the high-pass filter 19 and the lower band converted modulated chrominance signal output of the low-pass filter 23. The output of the mixer 24 is amplified by a recording amplifier 25 for actual recording. Numeral 26 designates an electromagnetic conversion system including magnetic heads and magnetic recording medium such as magnetic tape. Numeral 27 designates a pre-amplifier to amplify the reproduced signal. A high-pass filter 28 separates the frequency modulated luminance signal from the amplified recovered signal. Numeral 29 designates a demodulator to demodulate the frequency modulation of the luminance signal. A low-pass filter 30 separates the low frequency converted modulated chrominance signal from the amplified recovered signal. A burst gate 31 extracts the color burst. Numeral 32 designates an APC producing a continuous signal locked in phase and frequency to the extracted color burst. Numeral 33 designates a crystal oscillator oscillating at a frequency of 3.58 MHz. A balanced modulator 34 combines the output of the APC 32 and the output of the crystal oscillator 33. A band-pass filter 35 separates the sum frequency component $f_2$ from the output of the balanced modulator 34. A balanced modulator 36 combines the low frequency converted modulated chrominance signal output ($f_2$ − 3.85 MHz) of the low-pass filter 30 and the output $f_2$ of the band-pass filter 35. A band-pass filter 37 passes the difference frequency signal of the difference frequency between the frequencies of the output of the low-pass filter 30 and the output of the band-pass filter 35. A mixer 38 combines the demodulated luminance signal output of the demodulator 29 and the timing error corrected modulated chrominance signal output of the band-pass filter 37 to produce an NTSC signal including the timing error corrected chrominance signal appearing at an output terminal 39.

With the above system, however, steady and exact timing error cancellation cannot be ensured. This stems from the fact that changing the modulated chrominance signal to lower frequencies reduces the number of cycles in the color burst. Usually, in the lower frequency band conversion of the modulated chrominance signal a frequency of around 700 kHz is preset, into which the chrominance signal subcarrier frequency is shifted. This means that in comparison to about 8 cycles of the color burst in case of the 3.58 MHz color subcarrier as shown in FIG. 5a, only about 1.5 cycles of color burst is present in case of the shifted color subcarrier of 700 kHz as shown in FIG. 5b. With reduced burst cycles, the phase comparison in the APC phase comparator takes place a reduced number of times, so that it becomes extremely difficult to take out the APC loop gain. Besides, with reduced burst cycles in the extracted burst signal the burst gate pulse transient noise has an extremely bad influence upon the APC, rendering the APC operation unstable.

FIG. 6 shows a typical construction of the usual APC employed in the color video tape recorder. Its variable oscillator section consists of an LC coupled oscillator using a varicap as a variable reactance element. Its synchronizing characteristic is shown in FIG. 7. It has a pull-in range (within which pulling in from the detuned state takes place) and a hold range (within which detuning from the tuned state takes place). The maximum frequency $\Delta f_{max}$ in the pull-in range is expressed as $$\Delta f_{max} \cong f_H / \sqrt{1 + f_H 2/8\, mfc^2} \ldots \quad (4)$$

where $f_H$ is horizontal sync frequency, $f_c$ is DC loop gain, and $m$ is the ratio of the AC loop gain to DC loop gain. The APC circuit is one of sampling control systems and its pull-in range can not extend above the sample frequency 15.75 kHz (horizontal sync frequency). Equation 4 verifies this fact. The equation 4 also shows that the upper limit of the pull-in range is independent of the burst frequency, but if in actual practice the APC is constructed for burst frequencies of around 700 kHz, an extremely narrow pull-in range results from the above reason.

FIG. 8 shows the maximum frequency of the pull-in range and the corresponding hold range actually measured for various APC burst frequencies. In the measurements, the hold circuit constants are selected to suit the actual video tape recorder. As is seen from the Figure, the pull-in range is substantially saturated for burst frequencies higher than about 3 MHz; it is substantially constant for burst frequencies higher than about 3 MHz. On the other hand, for burst frequencies lower than 3 MHz the pull-in range sharply decreases with the decrease in the burst frequency; it is less than about 2 kHz for burst frequencies around 700 kHz. Thus, the conventional APC is useless for the color video tape recorder. It is desirable for the color vidoe tape recorder APC to provide a pull-in range as close to 15KHz as possible and hold range as broad as possible. Accordingly, it is desirable to set the frequency of the burst input to the APC phase comparator above about 3 MHz. In other words, it is desirable that the burst input contains more than about 6 cycles. With the system of FIG. 4, the frequency of the burst input to the APC phase comparator is about 700 kHz, so that a stable APC function cannot be obatined.

FIG. 9 shows an example of a continuous signal producing system designed on the basis of the above experimental results and applied to the low frequency conversion recording and reproducing system for stably and accurately removing the modulated chrominance signal jitter component in accordance with the invention. In this Figure, parts 16 to 30 and 36 to 39 are identical to the corresonding parts in FIG. 4. Reference character 31' designates a balanced modulator which modulates the low frequency converted modulated chrominance signal output ($f_2 - 3.58$ MHz) of the low-pass filter 30 in the presence of a crystal oscillator 32' oscillating at 3.58 MHz. A band-pass filter 33' passes the sum frequency signal component of the resultant signal combining the outputs of the low-pass filter 30 and the crystal oscillator 32'. A burst gate 34' extracts the burst signal at a frequency $f_2$ (about 4.3 MHz). The extracted burst signal drives an APC 35'.

It will be appreciated that in this system the low frequency converted modulated chrominance signal is changed to a higher frequency (about 4.3 MHz) so that the APC produces a continuous signal synchronized to a high frequency converted burst input. In this system, it is possible to obtain an extremely broad pull-in range as well as a broad hold range, as is apparent from the experimental results shown in FIG. 8, thus ensuring a stable and extremely accurate concellation of the jitter component in the modulated chrominance signal.

What is claimed is:

1. A continuous signal producing system for producing from an intermittent burst signal of several cycles a continuous signal phase locked to said intermittent burst signal, comprising means to convert said burst signal into a second intermittent signal of a frequency higher than the frequency of said burst signal in the presence of a stable local oscillator, and an automatic phase control means to produce said continuous signal phase locked to said second intermittent signal.

2. A continuous signal producing system according to claim 1, wherein said second intermittent signal contains at least 6 cycles in each intermittent burst interval.

3. A continuous signal producing system comprising means to derive a first reference signal from a low frequency converted color television modulated chrominance signal, means to derive from said first reference signal a second reference signal of a frequency higher than the frequency of said first reference signal in the presence of a source of a stable signal having a fixed frequency, and means to produce a continuous signal synchronized in phase and frequency to said second reference signal.

4. A jitter component removing system comprising means to derive a first reference signal from a recovered low frequency band converted modulated chrominance signal including a jitter component,means to produce from said first reference signal a second reference signal of a frequency higher than the frequency of said first reference signal in the presence of a source of a stable signal having a fixed frequency, means to produce a continuous signal synchronized in phase and frequency to said second reference signal, and means to combine said modulated chrominance signal and said continuous signal to thereby remove said jitter component from said modulated chrominance signal.

5. In a system for reproducing prerecorded color television signals, said signals including modulated chrominance and color burst signal portions, apparatus for removing time variation errors in said color television signals, comprising:

first modulating means for further modulating the reproduced chrominance and color burst signal portions with a preset reference signal;

filter means for passing only the portion of the output of said first modulating means which is substantially equal to the sum of the frequencies of said modulated signal portions and said reference signal;

gate means for detecting and passing only the portion of the output of said filter means corresponding to the burst signal portion thereof;

means for generating a continuous signal synchronized to the frequency and phase of the detected and passed burst signal portion; and second modulating means for further modulating said reproduced chrominance and burst signal portions with said continuous signal.

6. The apparatus according to claim 5, wherein the frequency of said reference signal has a greater magnitude than the modulating frequency of said chrominance and color burst signal portions of said color television signal.

* * * * *